J. F. NELSON.
BELT OR CHAIN TIGHTENER.
APPLICATION FILED SEPT. 16, 1920.

1,425,604. Patented Aug. 15, 1922.

Inventor.
Jenor F Nelson.
By Morsell & Keeney
Attorneys

UNITED STATES PATENT OFFICE.

IENAR F. NELSON, OF RACINE, WISCONSIN.

BELT OR CHAIN TIGHTENER.

1,425,604.  Specification of Letters Patent.  Patented Aug. 15, 1922.

Application filed September 16, 1920. Serial No. 410,732.

*To all whom it may concern:*

Be it known that I, IENAR F. NELSON, a citizen of the United States, and resident of Racine, in the county of Racine and State of Wisconsin, have invented new and useful Improvements in Belt or Chain Tighteners, of which the following is a description, reference being had to the accompanying drawings, which are a part of this specification.

The present invention relates to certain new and useful improvements in belt or chain tighteners and is shown in the accompanying drawing as being especially designed for use in connection with grindstones or the like.

It is one of the objects of this invention to provide means for tightening a driving belt or chain without disengaging the drive gear from the driven gear.

It is another object of this invention to provide a drive pinion gear in mesh with a main gear and capable of being swung on an arc using the axis of the main gear as a center whereby the relative positions of said gears may be changed without disengaging the same.

It is another object of this invention to provide a device of this class which will be of simple construction, durable and efficient in operation, and practical for the purpose described.

With the above and other objects in view which will appear as the description proceeds, my invention resides in the novel construction, combination and arrangement of parts substantially as hereinafter described and more particularly defined by the appended claim, it being understood that such changes in the precise embodiment of the hereindisclosed invention may be made as come within the scope of the claim.

Figure 1:
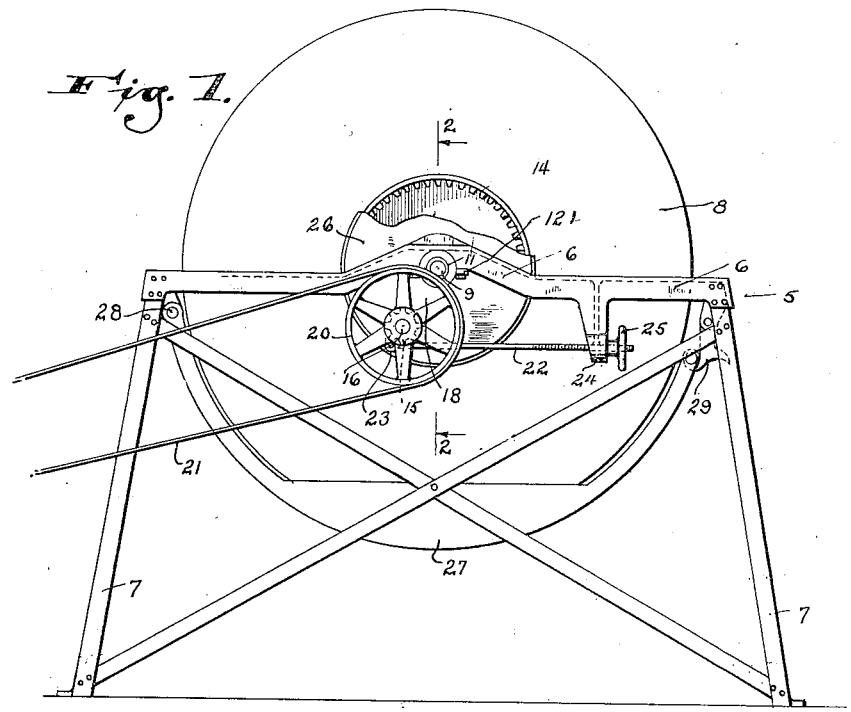
Figure 2:
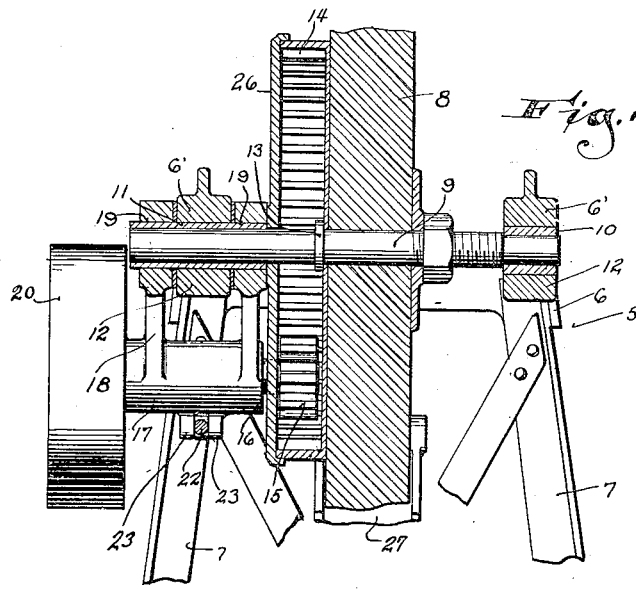

In the accompanying drawing I have illustrated one complete example of the physical embodiment of my invention constructed according to the best mode I have so far devised for the practical application of the principles thereof, and in which:

Figure 1 is a side view of a grindstone equipped with my invention, parts thereof being broken away to illustrate structural details; and Figure 2 is a view part in section and part in elevation taken on the plane of the line 2—2 of Figure 1.

Referring now more particularly to the accompanying drawing, numeral 5 designates a grindstone support including two spaced apart longitudinal frame members 6 and supporting legs 7; and 8 designates a grindstone rotatably carried by the support between the frame members 6.

The grindstone 8 is mounted on a shaft 9 journaled in bearing members 10 and 11 secured to the frame members 6 centrally of the intermediate raised portions 6' of the frame member 6. The bearing members 10 each include a movable cap 12 for securing the bearing bushing providing bearing journals for the shaft in place.

Secured to one side of the stone, by means of a boss or enlargement 13 on the shaft 9, is an internal gear 14, and in mesh with the teeth of said internal gear is a drive gear pinion 15. The pinion 15 is mounted on the inner end of a counter shaft 16 arranged parallel to the shaft 9 and journaled in the bearing 17 of a bearing bracket 18 formed by two spaced arms having their upper ends axially bored, as at 19, to receive the bushing of the bearing member 11. This construction permits the shaft 16 and with it gear 15, to be swung on an arc using the center of the shaft 9 as a center whereby the relative position of the gear 15 with respect to gear 14 may be changed without disconnecting said gears.

Mounted on the outer end of the counter shaft 16 is a drive pulley 20 about which trains a drive belt 21 which leads to a source of power. When it is desired to tighten or loosen the belt 21, the bearing bracket 18 is swung on its pivot by means of an adjusting rod 22 having its inner end pivotally connected to two spaced lugs 23 formed on the bearing 17 and its outer end threaded and passed through a depending arm 24 of the adjacent frame member 6. A handle or nut 25 is engaged with the threaded portion of the rod 22 outwardly of the arm 24 for obtaining the desired adjustment, as will be readily apparent.

The gears 14 and 15 are protected by a plate 26 which closes the open side of the gear 14 and which is rotatably mounted on the shaft 9. The counter shaft 16 passes into the interior of the gear 14 through an opening in said plate, and when the shaft 16 is swung on its arm, the plate 26 is revolved therewith as will be readily apparent.

The lower portion of the stone 8 runs in water or other suitable fluid contained in a trough 27 carried by the support, and as the stone 8 deteriorates if allowed to stand in the fluid, when not in use, means are provided for adjustably securing the trough to the support, whereby the same may be lowered to bring the level of the water below the periphery of the stone. The trough 27 has one end pivotally secured, as at 28, between the frame members 6 and its other free end readily releasably secured to the frame members 5 by a latch 29.

What I claim as my invention is:

In a device of the class described, the combination with a journaled shaft, of an internal gear carried thereby, a plate closing said gear, a counter shaft parallel with the first named shaft and movable in an arc using the axis of the internal gear as the center, said counter shaft having its inner end extended into said gear through the plate, a drive gear on the inner end of the counter shaft and in mesh with the internal gear, and means for swinging the counter shaft to change the relative positions of said gears without disengaging the same.

In testimony whereof, I affix my signature.

IENAR F. NELSON.